(12) United States Patent
Dikovsky et al.

(10) Patent No.: US 11,904,544 B2
(45) Date of Patent: Feb. 20, 2024

(54) SUPPORT APPARATUS

(71) Applicant: Redefine Meat Ltd., Rehovot (IL)

(72) Inventors: Daniel Dikovsky, Ariel (IL); Tomer Katz, Tel Aviv (IL)

(73) Assignee: Redefine Meat Ltd., Rehovot (IL)

( * ) Notice: Subject to any disclaimer, the term of this patent is extended or adjusted under 35 U.S.C. 154(b) by 0 days.

(21) Appl. No.: 17/851,909

(22) Filed: Jun. 28, 2022

(65) Prior Publication Data

US 2023/0001638 A1    Jan. 5, 2023

(30) Foreign Application Priority Data

Jun. 30, 2021    (IL) .......................................... 284526

(51) Int. Cl.
| | |
|---|---|
| *B29C 64/245* | (2017.01) |
| *B33Y 10/00* | (2015.01) |
| *B33Y 30/00* | (2015.01) |
| *B33Y 50/02* | (2015.01) |
| *B29C 64/393* | (2017.01) |
| *F16M 11/18* | (2006.01) |

(52) U.S. Cl.
CPC .......... *B29C 64/245* (2017.08); *B29C 64/393* (2017.08); *B33Y 10/00* (2014.12); *B33Y 30/00* (2014.12); *B33Y 50/02* (2014.12); *F16M 11/18* (2013.01)

(58) Field of Classification Search
None
See application file for complete search history.

(56) References Cited

U.S. PATENT DOCUMENTS

| | | |
|---|---|---|
| 2016/0067740 A1 | 3/2016 | Voris et al. |
| 2018/0194070 A1 | 7/2018 | Dikovsky et al. |
| 2020/0329814 A1 | 10/2020 | Wang et al. |
| 2022/0402208 A1 * | 12/2022 | Inomoto ................ B33Y 50/02 |

FOREIGN PATENT DOCUMENTS

| | | |
|---|---|---|
| WO | 2017/180958 A2 | 10/2017 |
| WO | 2021/124734 A1 | 6/2021 |
| WO | WO-2021 124734 A1 * | 6/2021 |

OTHER PUBLICATIONS

Extended European Search Report dated Nov. 14, 2022 in European Application No. 22182006.1.

* cited by examiner

*Primary Examiner* — Mohammad M Ameen
(74) *Attorney, Agent, or Firm* — Sughrue Mion, PLLC (57) ABSTRACT

A support apparatus for use in conjunction with an ALM system having a printing head being movable with respect to the support apparatus. The support apparatus a dynamic surface configured to support a printed 3D item thereon during fabrication thereof by the printing head, the dynamic surface being manipulable between a first position, at which the dynamic surface has a first concavity with respect to the printing head, and a second position, at which the dynamic surface has a second concavity with respect to the printing head, the second concavity being greater than the first concavity; and a manipulating mechanism operable to induce manipulation the dynamic surface at least from the first position to the second position.

39 Claims, 10 Drawing Sheets

SUPPORT APPARATUS

TECHNOLOGICAL FIELD

The presently disclosed subject matter relates to a support apparatus for use with an additive layer manufacturing (ALM) system, and more particularly, to a support apparatus configured to provide dynamic support for the production of a printed 3D item.

BACKGROUND

ALM systems have become more widely used over recent years in order to produce printed 3D items. Material extrusion is one kind of additive manufacturing processes, in which material is extruded, or drawn through a nozzle mounted on a movable arm. The nozzle moves horizontally for fabrication of each layer, while vertical movement between the support and the bed allows the layers to be placed in successive manner.

GENERAL DESCRIPTION

In accordance with one aspect of the presently disclosed subject matter, there is provided a support apparatus for use in conjunction with an ALM system having a printing head being movable with respect to the support apparatus. the support apparatus comprising a dynamic surface configured to support a printed 3D item thereon during fabrication thereof by the printing head. The dynamic surface being manipulable between a first position, at which the dynamic surface has a first concavity with respect to the printing head, and a second position, at which the dynamic surface has a second concavity with respect to the printing head. The second concavity being greater than the first concavity. The support apparatus also comprises a manipulating mechanism operable to induce manipulation the dynamic surface at least from the first position to the second position.

The support apparatus of the above aspect can be configured to provide support for each layer fabricated by the ALM system. The first layer is fully supported by the dynamic surface. Then, for each consecutive layer to the first layer, the support apparatus of the above aspect is configured to be manipulated in order to provide support, which in addition to the support provided by a preceding layer, will enable the support apparatus to support a consecutive layer having a larger surface area than its preceding layer.

The problem solved by the present invention is the need to fabricate 3D items that has at least a bottom half having a curved shape, without the need for disposable or removable support materials. In contrast to the teachings of the presently disclosed subject matter, prior publications disclose introducing removable support, either disposable or re-usable that are required to be disposed of or cleaned each time an item is fabricated, and are suitable for only a single type of a printed 3D item by providing a certain structure, onto which layers are printed.

The presently disclosed subject matter can be used for fabricating edible printed 3D items for the food industry, and in particular, for fabricating a printed 3D foodstuff item having a curved surface, at least at its bottom half, made from a semi-solid material. Typically, fabricating a printed 3D foodstuff item from semi-solid materials requires firm support due to the fabrication method of an ALM system. For example, in extrusion type ALM systems, layers could have been at the same size or smaller than the layers beneath them, or elsewise, threads of material may spill from the edges of a further layer that is not being directly supported by the previous layer, while requiring an increased curing time between the printing of the layers for enabling each layer to support another layer on top of it with a surface area larger therefrom.

The support apparatus according to the above aspect can have any one or more features described below in any combination thereof.

At the first position of the dynamic surface, it can have a first surface area, and at the second position thereof, the dynamic surface can have a second surface area being larger than the first surface area.

The support apparatus can comprise two curvature enabling members, each associated with a respective lateral side of the dynamic surface and configured to enable the manipulating mechanism to increase the curvature of the dynamic surface thereby.

The curvature enabling members is configured to react to the manipulation made by the manipulation mechanism, so as to enable the curvature of the dynamic surface to be increased. The manipulation mechanism can be configured to induce displacement of the dynamic surface, wherein the displacement of the dynamic surface is enabled by the curvature enabling members. Alternatively, the manipulation mechanism can be configured to displace the curvature enabling members, so as increase the curvature of the dynamic surface by acting thereon.

Each of the two curvature enabling members can be distanced to a different lateral side of a print axis along a cross-print axis, where the concavity of the dynamic surface can be measured between the two curvature enabling members. Each of the curvature enabling members can be aligned on an axis parallel to the print axis and constitutes a lateral edge of the dynamic surface. In some cases, the curvature enabling members are not symmetrical with respect to the print axis.

The manipulating mechanism can be configured to gradually increase the curvature of the dynamic surface from the first position to the second position thereof hence, there can be many intermediate positions in between the first position and the second position. There can also be third and fourth positions, having third and fourth curvatures larger than the second and third curvatures, respectively.

The manipulating mechanism can have a first state, corresponding to the first position of the dynamic surface, in which the dynamic surface is not enabled to reach its second concavity, and a second state, corresponding to the second position of the dynamic surface, in which the dynamic surface is enabled to reach its second concavity. In some cases, in the first state of the manipulating mechanism, the manipulation mechanism can be configured to prevent the dynamic surface from reaching its second concavity under the influence of gravity, and in the enabling state of the manipulating mechanism, it can be configured to enable the dynamic surface to reach its second concavity under the influence of gravity.

The manipulating mechanism can be configured to gradually change the state of the dynamic surface from the first state to the second state, in an automated manner in accordance with the amount of weight supported by the dynamic surface.

The manipulating mechanism can be configured to provide the dynamic surface with a bottom support, such that in first position thereof most of the dynamic surface is being supported, and in the second position thereof most of the dynamic surface is free from being supported thereby. In a first example, the dynamic surface can comprise a plurality of links hingably connected to each other, the dynamic surface can be pivotally connected to a support member by first and second lateral links, and the manipulating mechanism can comprise a bottom support moveably positioned below the dynamic surface.

The bottom support of the manipulating mechanism can be moveable between the first position of the dynamic support, in which it provides support for all of the links of the dynamic surface, and the second position of the dynamic support, in which none of the plurality of links of the dynamic surface are supported thereby.

The bottom support can also comprise at least a pair of opposite motorized bars, each being positioned from a different lateral side of the print axis, and are operable to be moved in opposite directions. In some cases, the pair of opposite motorized bars can be operative to move simultaneously. In some cases, each one of the motorized bars can be configured with a length which is at least equal to the length between its corresponding lateral link of the dynamic surface to the print axis.

The bottom support structure can be configured to be arrested in any position along its path from the first position of the dynamic surface and the second position of the dynamic surface.

The dynamic surface can be made from a thin sheet of elastic material dimensioned and operable to be supported by a support member, and the manipulating mechanism comprises a vertical displacement mechanism having at least a portion thereof positioned between the dynamic surface and the support member. The vertical displacement mechanism can be moveable between a first state corresponding to the first position of the dynamic surface, in which at least the portion thereof that is positioned between the dynamic support and the support member is distanced from the support member to a first distance, and a second state corresponding to the second position of the dynamic support structure, in which at least the portion thereof positioned between the dynamic surface and the support member is distanced from the support member to a second distance larger than the first distance.

The manipulating mechanism can be constituted by a pair of elevating rods positioned in parallel to the print axis, each on other lateral side thereof, and are operable to be moved simultaneously and in a mirror image manner. In some cases, each one of the elevating rods can be configured with a length corresponding to the length of the dynamic surface along the print axis, so as to enable each of the elevating rods to vertically elevate a corresponding portion of the dynamic surface during transition from the first position to the second position.

At least a portion of the dynamic surface can be configured to rest onto the support member in both the first and the second positions. In some cases, the dynamic surface can be secured at both of its ends to a portion of the support member to maintain a predetermined tension at least in the first position thereof.

The support apparatus can further comprise a processing module configured to receive data from the ALM system and to actuate the manipulating mechanism in accordance with the received data. The received data from the ALM system can comprise the number of layers constituting the printed 3D item, and configured to operate the manipulating mechanism in accordance with the serial number of the layer that is about to be printed.

In some cases, the received data can further comprise measurements of the layers constituting the printed 3D item, and configured to operate the manipulating mechanism for providing sufficient support for layers that are configured with greater measurements than their preceding layer. The received data can also comprise the accumulated weight present onto the dynamic surface.

The curvature of the dynamic surface can form a spaceless continuous sheet of elastic material.

The fabricated 3D item can be made from edible materials.

In accordance with a second aspect of the presently disclosed subject matter, there is provided a method for fabricating a printed 3D item, the method comprising:

a. providing a an ALM system comprising: a processing module; a movable printing head controllable by the processing module; and a support apparatus comprising:
  i. a dynamic surface configured to support fabrication of the printed 3D item thereon by the printing head, the dynamic surface being manipulable between a first position, at which the dynamic surface has a first concavity with respect to the printing head, and a second position, at which the dynamic surface has a second concavity with respect to the printing head, the second concavity being greater than the first concavity; and
  ii. a manipulating mechanism operable to induce manipulation the dynamic surface at least from the first position to the second position.
 b. providing to the processing module a product design having pattern coordinates to the ALM system;
 c. providing by the processing module instructions for the printing head to print at least one layer onto the dynamic surface in accordance with the pattern coordinates;
 d. providing by the processing module instructions for the manipulation mechanism to increase the concavity of the dynamic surface from the first concavity; and
 e. providing instructions for the printing head to print at least one further layer having a surface area larger than the first layer on top of the first layer in accordance with the pattern coordinates.

The method according to the above aspect can have any one or more features described below in any combination thereof.

The method can further comprise step c* between steps c and d, comprising calculating whether the next layer should require further support in addition to the support provided by the previous printed layer, and if so to calculate the extent of support that the dynamic surface should provide to be able to sufficiently support the next layer in addition to the support provided by the preceding layer and wherein the instructions provided in step d are based on said calculation.

The pattern coordinates can comprise sequential cross-sectional layers of the printed 3D item being fabricated, each of the cross-sectional layers comprises a plurality of pixels, wherein each pixel comprises signals for the printing head for fabricating at least one of two edible components on a corresponding pixel on the support apparatus. in some cases, the pixels can be configured to comprise void signal signaling the printing head to leave a corresponding pixel on the support apparatus empty. In some cases, the number of pixels having void signal therein can be configured to increase or remain same between each layer with respect to its preceding layer, at least in a bottom half of the printed 3D item.

In accordance with a third aspect of the presently disclosed subject matter, there is provided an ALM system for fabrication of a printed 3D item, said ALM system comprising: a processing module; a moveable printing head controllable by the processing module; and a support apparatus comprising: dynamic surface configured to support fabrication of the 3D item thereon by the printing head, the dynamic surface being manipulable between a first position, at which the dynamic surface has a first concavity with respect to the printing head, and a second position, at which the dynamic surface has a second concavity with respect to the printing head, the second concavity being greater than the first concavity; and a manipulating mechanism operable by the processing module to induce manipulation the dynamic surface at least from the first position to the second position.

The printing head can comprise at least one extruder and can be moveable along a print axis and a cross-print axis, while being configured to maintain the orientation of the at least one extruder relative to the ground.

The printing head can also be moveable along a Z axis. This can be made by either moving the support apparatus or moving the printing head along the Z-axis.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The presently disclosed subject matter is directed to a support apparatus for use in conjunction with an ALM system having a printing head being movable with respect to the support apparatus. The support apparatus comprises a dynamic surface configured to support a printed 3D item thereon during fabrication thereof by the printing head, and a manipulating mechanism operable to induce manipulation the dynamic surface. The dynamic surface is manipulable by the manipulating mechanism between a first position, at which the dynamic surface has a first concavity with respect to the printing head, and a second position, at which the dynamic surface has a second concavity with respect to the printing head. The second concavity is greater than the first concavity.

The support apparatus of the presently disclosed subject matter is operable to provide support for the fabrication of a printed 3D item having at least a curved lower portion. The support apparatus can be configured to provide support by gradually increasing the curvature of at least a portion thereof with the addition of one or more printed layers during the fabrication process. This increase of curvature allows printing layers that are configured with a larger surface area than their preceding layers.

The support apparatus can be configured to operate in conjunction with an ALM system, enabling it to fabricate at least one material thereon to form printed 3D items having a curved surface at least in their bottom half. The ALM system can comprise a printing head being movable with respect to the support apparatus. In some cases, the printing head can be configured to fabricate material onto the support apparatus by extrusion.

In general, the printing head can be configured to be positioned at about the same distance from at least the portion of the support apparatus that is configured to support extruded material from the printing head during the fabrication process of the 3D item. In some cases, the printing head can comprise extruders that can be configured to extrude filaments of at least one material, or at least a portion of such filaments, onto the support apparatus. Upon operation thereof, the printing head can be moveable with respect to the support apparatus at least along a P axis and along an XP axis, being normal to the P axis, and in further cases, the printing head can be moveable along a Z axis. According to other examples, the printing head 10 can be movable at any other known in the art directions defined by any other coordinates, such as a spherical coordinates. The printing head can be movable with respect to the support apparatus either by movement of the printing head, by movement of at least a portion of the support apparatus, or by a combination thereof.

In some cases, the printing head can be configured to extrude, via one or more extruders, a filament of material onto the support apparatus. The printing head can be configured to extrude the filament along or in parallel to the P axis to a first direction, move along or in parallel to the XP axis, and then to extrude the filament along or in parallel to the P axis to a second direction opposite to the first direction, and so on to fabricate a layer of extruded material. Then, the newly fabricated layer is being distanced from the printing head, to enable fabrication of a new layer on top of the preceding one.

After fabrication of the first layer onto the support apparatus, the support apparatus can be configured to provide support also for the next layers. The support apparatus can do so by increasing the amount of surface area thereof available to support the fabricated 3D item. The amount of support provided by the support apparatus can increase in order to correspond to the number of layers of the 3D item that are placed on top of each other, or at least for the bottom half thereof.

The support apparatus can increase the amount of support by increasing the amount of surface area of a portion thereof available to support the 3D item by causing at least a portion thereof to change its orientation with respect to the printing head. For example, the support apparatus can increase the curvature of at least a portion thereof, such that part of that curved portion will be positioned at the same level with the preceding layer, and in proximity thereof, to enable extrusion of filaments to form a layer on top of the preceding layer and the curved portion.

In some cases, the extruded material can be edible material for fabrication of an edible 3D item. In further cases, the extruded material can be configured with a semi-solid properties, at least until curing thereof. In such cases, the support apparatus can be configured to increase the amount of support provided thereof while being prevented from increase the amount of support to a degree in which it prevents the printing head from reaching its coordinates above the support apparatus. Also, support apparatus can be prevented from increasing the amount of support to a degree in which the curvature of the support apparatus presses the lateral edges of the layers at the bottom half of the fabricated 3D item towards each other to an extent greater than the extent determined by a user.

In general, the support apparatus can comprise a dynamic surface operative to change it structure for supporting the printed 3D item during fabrication thereof. The dynamic surface can be manipulable between an initial, first position, at which the dynamic surface has a first position, enabling the printing head to fabricate a first layer having a first surface area, and at least one second position, enabling the printing head to fabricate a second layer having a second surface area larger than the first surface area. The support apparatus can be configured with at least one intermediate position in between the first position and the second position, where each of the at least one intermediate position can have a surface area corresponding to its position being larger than the first surface area and smaller than the second surface area. The support apparatus can also be configured with at least one further position, such as a third and a fourth positions, in which a portion of the support apparatus can have a curvature larger than their consecutive curvature.

The support apparatus can further comprise a manipulating mechanism operative to induce manipulation of the dynamic surface, at least from the first position to the second position, and in further cases, through each of the at least one intermediate position. The dynamic surface can be manipulable, either directly by the manipulating mechanism or indirectly where the manipulating mechanism enables the dynamic surface to be affected by gravity, so as to increase the amount of support provided to the printed 3D item fabricated thereon.

The term "increase the amount of support" as used hereinafter, relates to the size of the surface area that is configured to be, or already in contact with the fabricated material forming the printed 3D item.

The manipulating mechanism can have a first state, in which the dynamic surface is prevented from reaching its second concavity, and a second state, in which the dynamic surface is not being prevented from reaching its second concavity. In some cases, the manipulating mechanism can increase the amount of potential energy of the dynamic surface between the first state and the second state. In some cases, the manipulating mechanism can provide a bottom support that prevents the dynamic surface from increasing its curvature by the influence of gravity, and the manipulating mechanism can remove the bottom support to enable the dynamic surface to increase its curvature by the influence of gravity.

In general, the dynamic surface can be configured to increase its curvature to provide an increased amount of support corresponding to the number of layers of the printed 3D item already fabricated thereon. As such, dynamic surface can comprise an initial, first position, in which it has a first concavity with respect to the printing head, and with a second position, at which the dynamic surface has a second concavity with respect to the printing head, being greater than the first concavity. By increasing the concavity, a portion of the dynamic surface can be configured to serve as lateral support, at least from one lateral side of the print axis to a lateral portion of the second layer.

In some cases, the support apparatus can comprise a processing module that can be configured to operate the support apparatus regardless of the ALM system. In other cases, the processing module of the support apparatus is common with the processing module that operated the ALM system. The processing module can be configured to receive a 3D computerized design of a printed 3D item that is configured to be fabricated thereon. The processing module can be configured to provide instructions to the manipulation mechanism to change the curvature of the dynamic surface. The processing module can also be operative to calculate whether the next layer should require further support in addition to the support provided by the previous printed layer, and if so—calculating the extent of support that the dynamic surface should provide to be able to sufficiently support the next layer in addition to the support provided by the previous layer and providing instructions for the manipulating mechanism accordingly.

In other cases, the support apparatus can constitute a portion of a printing system having an ALM system with a processing module that can be configured to operate the entire and synchronize the fabrication of the layers with the operation of the manipulating mechanism in a coordinated manner. The processing module can be configured to receive a 3D computerized design of a 3D item that is configured to be fabricated on the support apparatus by the printing head.

The processing module can be configured to provide instructions to the printing head to extrude filaments of material onto the dynamic support to form a first layer. Then, or in parallel to the fabrication of the first layer, the processing module can instruct the manipulation mechanism of the support apparatus to change the curvature of the dynamic surface so as to provide support for the next layer or for a filament of material that is about to be extruded by the printing head.

In some cases, the processing module can be configured to calculate the amount of force that the increase in curvature would cause the support apparatus to apply on the layers of the bottom half of the fabricated 3D item. In such cases, the processing module can instruct the printing head to revise the 3D computerized design of the printed 3D item, such that material will be extruded in a manner allowing it to be pressed without changing the final design of the printed 3D item.

The term "concavity" or "curvature" as used hereinafter, relates to the curvature of the surface of the dynamic surface that faces the printing head, and by which the printed 3D item should be supported during fabrication.

Whilst the illustrated apparatus is symmetrical relative to the plane of symmetry, at least some of its components can be asymmetrical.

Figure 1A:
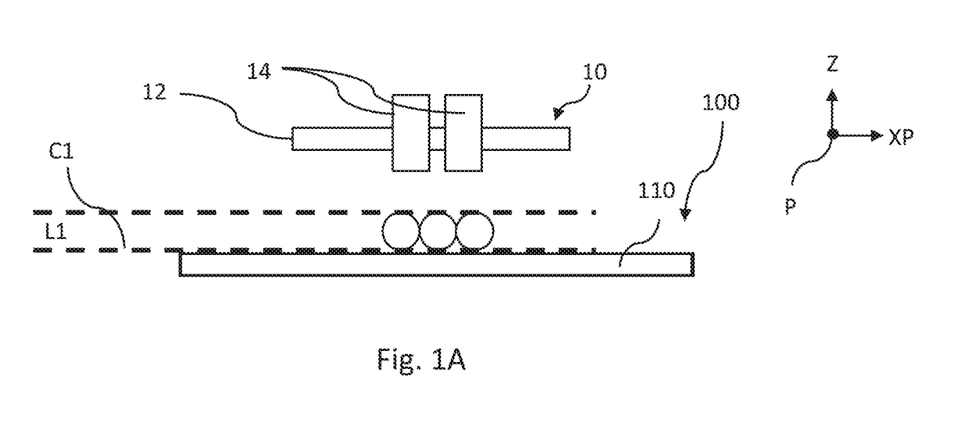
FIG. 1A schematically illustrates fabrication of a printed 3D item by an ALM system onto its support apparatus according to the presently disclosed subject, an initial first position with a first printed layer thereon.
Figure 1B:
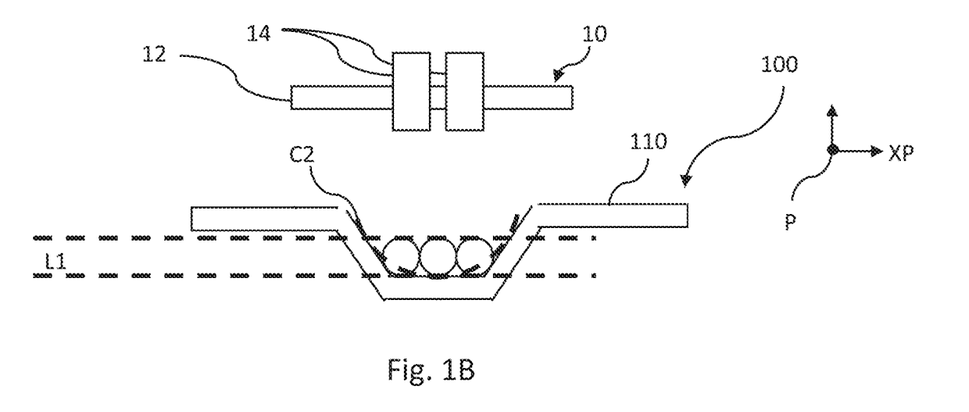
FIG. 1B schematically illustrates the support apparatus of FIG. 1A at a second position.
Figure 1C:
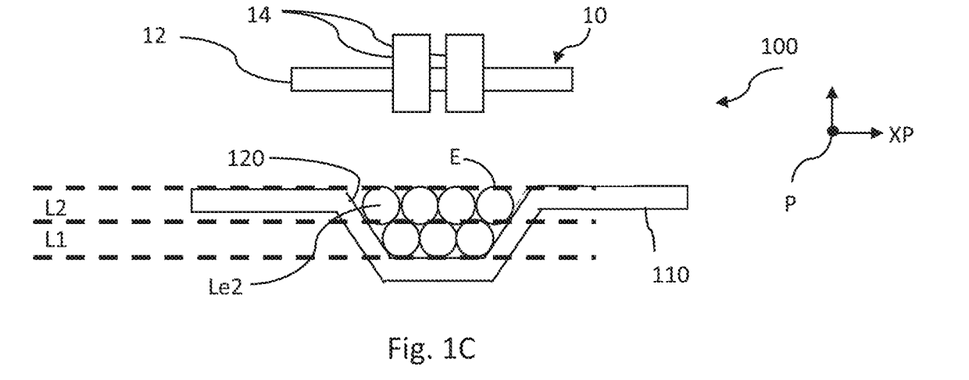
FIG. 1C schematically illustrates the support apparatus of FIG. 1B with a second layer on top of the first layer thereon.

FIGS. 1A-1C, illustrate a schematic model of the support apparatus of the present invention, designated as 100, used in conjunction with an ALM system (not shown) having a printing head 10 having one or more extruders 14. The printing head 10 is movable by a driving element 12 with respect to the support apparatus 100. According to the present example, the printing head 10 is moveable along cartesian coordinates defined by a print axis designated as P, a Cross-print axis designated as XP and a vertical axis designated as Z.

The support apparatus 100 comprises a dynamic surface 110 operative to increase at least a portion of its curvature during the fabrication process of the printed 3D item by the printing head. The dynamic surface 110 is configured with a first position, at which it has a first concavity with respect to the printing head 10.

As shown in FIG. 1A, a portion of the dynamic surface 110 under the printing head 10 is at the first position with a first concavity C1 of about zero, enabling the printing head to fabricate a first layer L1 thereon. Then, in order to provide support for a second layer on top of the first layer, a manipulating mechanism (not shown) operates to induce manipulation of the dynamic surface 110 towards a second position, shown in FIG. 1B. In the second position, a portion of the dynamic surface 110 under the printing head 10 has a second concavity C2 with respect to the printing head, being greater than the first concavity C1. In the second position, the curved portion of the dynamic surface 110 forms a lateral inclined sidewall 120, configured to provide a bottom support for the fabrication of a second layer L2, having a second surface area greater than the surface area of the first layer, and specially the lateral edges thereof Le2, together with the first layer L1 that was already fabricated, as shown in FIG. 1C.

In general, the support apparatus can comprise one or more curvature enabling members, configured to enable the dynamic surface to increase or decrease its concavity with respect to the printing head. The curvature enabling members can be positioned at opposite lateral sides of the lateral sidewall 120 along the cross-print axis XP, and configured to react to the manipulation made by the manipulation mechanism, so as to enable the curvature of the dynamic surface to increase.

The portion of the dynamic surface that is configured to change its curvature can be linked to the support apparatus by two or more curvature enabling members. Each of the two or more curvature enabling members being positioned at opposite lateral sides of the print axis P along the cross-print axis XP. It is emphasized that the curvature of the dynamic surface is measured between the two curvature enabling members.

The dynamic surface can comprise one or more elements made from a rigid material, and the manipulation mechanism can be configured to control the positioning of the one or more elements of the dynamic surface with respect to the printing head. In some cases, the manipulation mechanism can comprise two or more bottom supports configured to be positioned under the support portion and be moved gradually to opposite directions along the cross-print axis XP, thereby allowing an increasing portion of the dynamic surface to sink dure to the influence of gravity and thereby increase its curvature.

FIGS. 2A-2E illustrate a first example of the support apparatus of the presently disclosed subject matter, designated as 200. The support apparatus 200 comprises a support member 210 having the print axis P traversing the center thereof, and a cross-print axis XP horizontally normal to the print axis P traversing the length of the support member 210. The support member 210 is constituted by a table having a central opening 212 at its center, and a dynamic surface 220 comprising a plurality of rigid links 222 slidably connected to one another. The plurality of rigid links 222 comprises first side links 222A and second side links 222B, positioned at the first and second lateral ends of the print axis P of the dynamic surface 220.

Figure 2A:
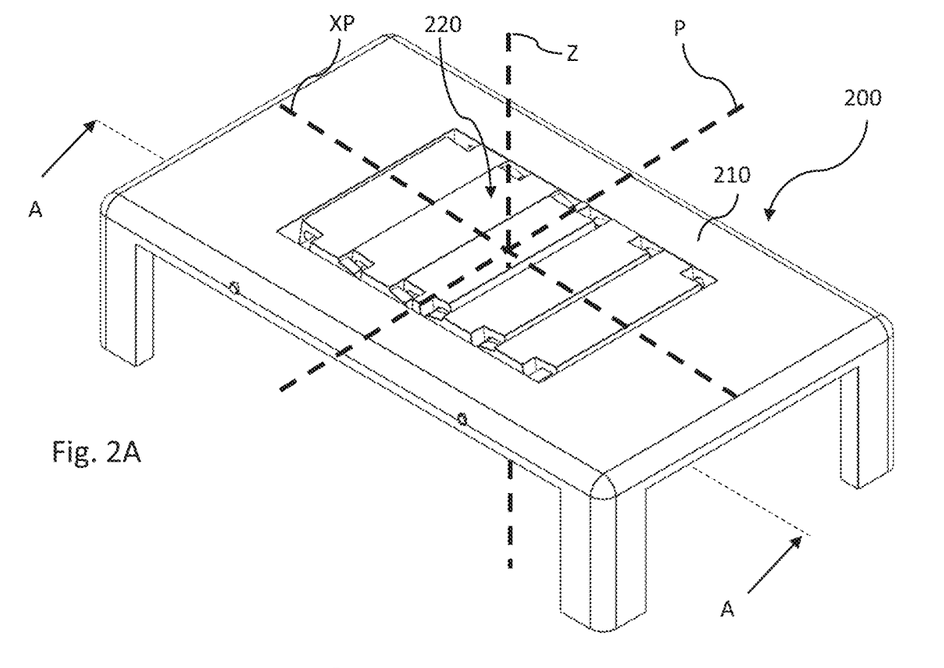
FIG. 2A illustrates a support apparatus having a dynamic surface according to a first example of the presently disclosed subject matter.
Figure 2B:
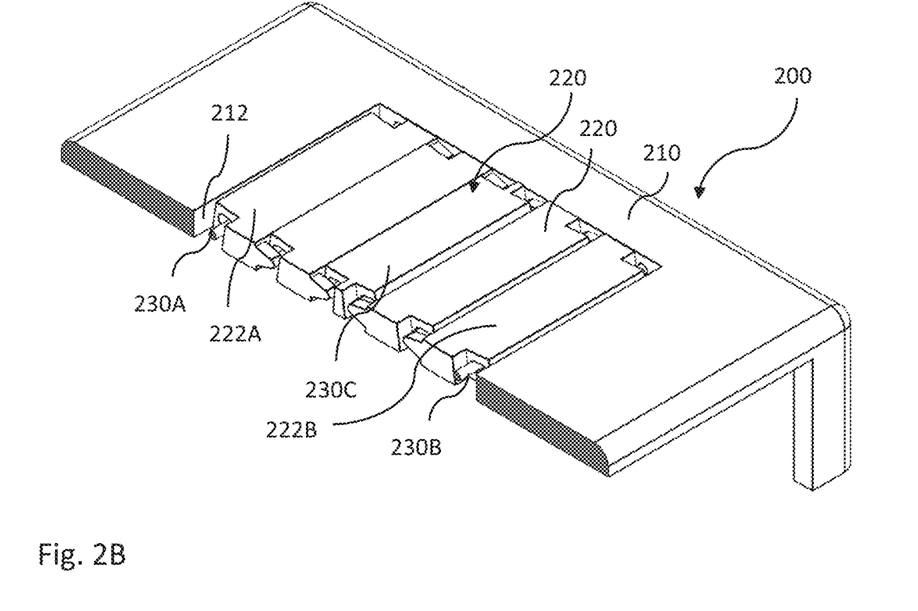
FIG. 2B is a cross-sectional view of the support apparatus shown in FIG. 2A, taken along the vertical plane A-A, revealing the side surface of the dynamic surface.

In general, the dynamic surface of the first example can comprise a plurality of interconnected rigid elements in the form of links. The dynamic surface can be configured to increase the curvature thereof by gradually increasing the space between the adjacent links. The links can be positioned symmetrically with respect to the print axis P. In accordance with another embodiment of the first example, the dynamic surface can be configured to change its curvature by increasing the number of links, that are configured with predetermined distance from each other, in the central opening of the support member.

In the present example, the dynamic surface comprises a plurality of interconnected first side links 222A from a first side of the print axis P and a plurality of second lateral links 222B from a second side of the print axis P. The most distal link from the print axis P of the first side links 222A and the second lateral links 222B are pivotally connected to the support member 210 by a first and second curvature enabling member 230A and 230B, respectively. The first side links 222A and the second lateral links 222B are interconnected by a central link 222C. The central link 222C is located on a plane defined by the print axis P and a vertical axis Z vertically normal to the print axis P, and the rest of the links are positioned in parallel to the print axis P.

Figure 2C:
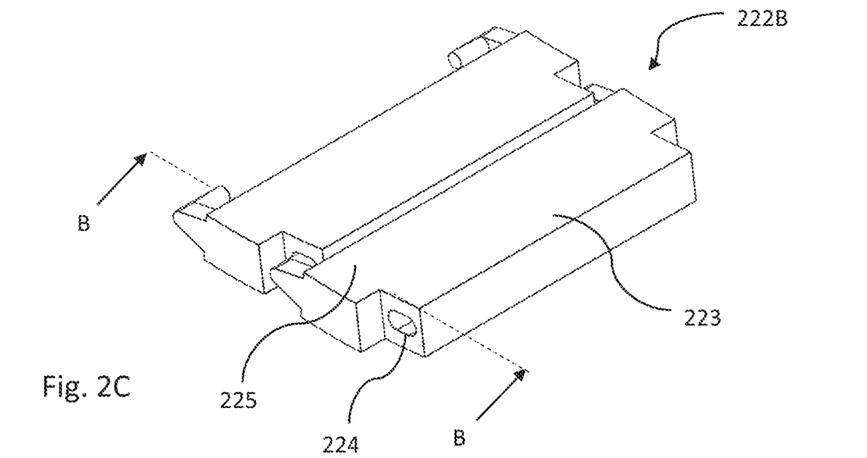
FIG. 2C is a perspective view of two connected links of a dynamic surface of the apparatus shown in FIG. 2A.
Figures 2D, 2E:
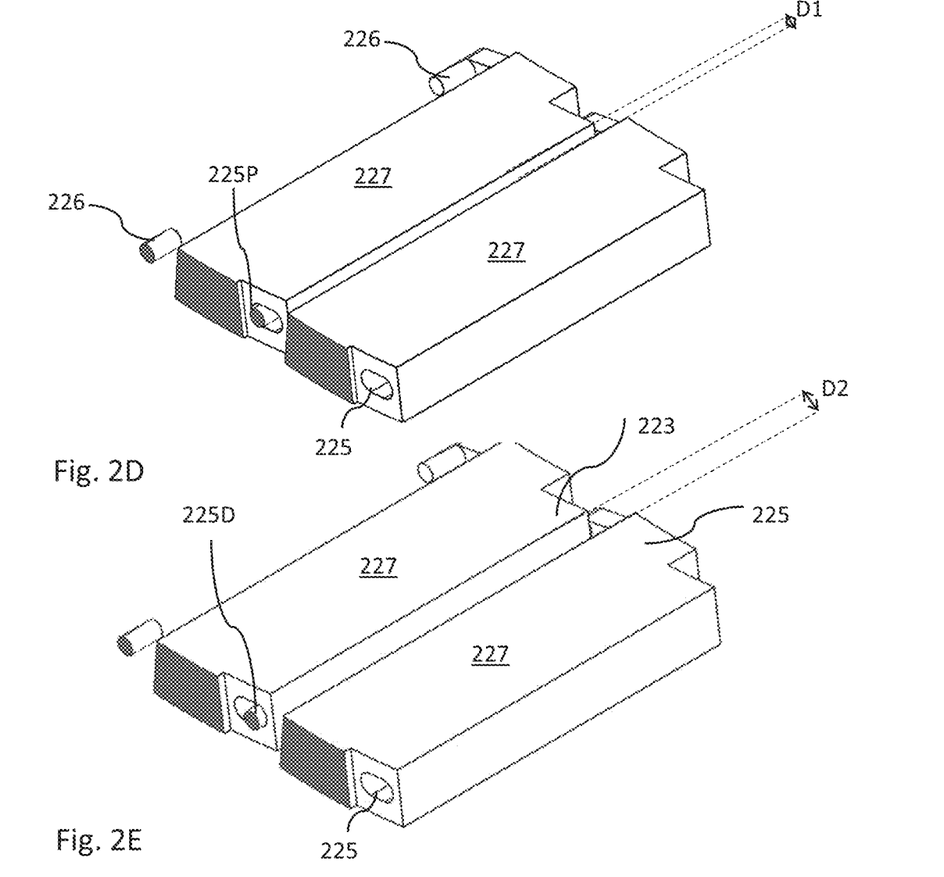
FIG. 2D is a cross-sectional view of the two connected links shown in FIG. 2C along the vertical plane B-B, having a proximal protrusion received at a proximal end of an opening.
FIG. 2E is a cross-sectional view of the two connected links shown in FIG. 2C along the vertical plane B-B, having a proximal protrusion received at a distal end of an opening.

As shown in FIGS. 2C-2E, each link of the first side links 222A and the second lateral links 222 comprises a top surface 227, distal portion 223, through which it is configured to receive a portion of either a corresponding curvature enabling member, or another same side link, and a proximal portion 225, through which it can be connected to another same side or central link 222C. The distal portion 223 comprises two openings 224 disposed at a front face and a back face of each link, both aligned on an axis parallel to the print axis P. The proximal portion 225 comprises two proximal protrusions 226, configured to be slidably received within corresponding openings 224 of another link. Each of the two openings 224 has an oval shape and has a proximal end 225P and a distal end 225D. The proximal end 225P is dimensioned such that when a proximal protrusion 226 of an adjacent link is received therein, the proximal end 225P of the adjacent link is distanced in a first distance D1 from the distal portion 225D of the link (as shown in FIG. 2D). The distal end 225D is dimensioned such that when a proximal protrusion 226 of an adjacent link is received therein, the proximal end 225P of the adjacent link is distanced in a second distance D2, larger than the first distance D1 from the distal portion 225D of the link (as shown in FIG. 2E). The second distance D2 is designed to be large enough to increase the distance between each two links so as to enable them to be angled to one another (in order to increase the curvature), and be small enough such that the links would still provide support to the fabricated item by their top surface 227.

The manipulation mechanism of the first example, best illustrated in FIGS. 4A-4D, comprises a first and second bottom support members 240A and 240B. Each of the first and second bottom support members 240A and 240B is movably connected below the support member 210, and is has a length greater than the length between the central link 222C and one of the lateral edges of the central opening 212. Each of the first and second bottom support members 240A and 240B is movable corresponding to the position of the dynamic surface. In the first position of the dynamic surface, the manipulation mechanism is in a first state, in which each of the first and second bottom support members 240A and 240B provides support below its corresponding side of the first side and second side lateral links 222A and 222B, so as to prevent them from increasing their concavity, and the concavity of the entire dynamic surface as a result, under the influence of gravity. In the second position of the dynamic surface, the manipulation mechanism is in its intermediate state, in which each of the first and second bottom support members 240A and 240B is moved to a direction away from the print axis P along the cross-print axis XP, so as to provide support below fewer links of the first side and second side lateral links 222A and 222B, so as to enable the unsupported links to fall, and as a result of that, to increase the concavity of the dynamic surface 220 to its second concavity, under the influence of gravity.

Figure 3A:
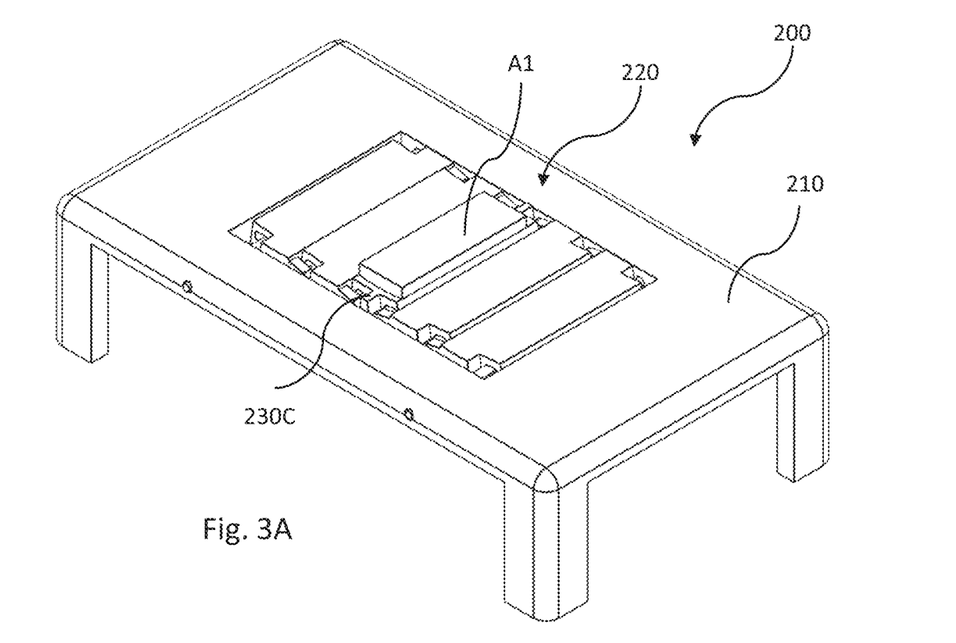
FIG. 3A is a perspective view of the support apparatus shown in FIG. 2A with the dynamic surface at a first position and a first layer of a printed 3D item placed thereon.

FIGS. 3A to 3D, and FIGS. 4A to 4D illustrate the support apparatus 200 of the first example during a fabrication process of a printed 3D item A. As shown in FIG. 3A, and its cross section without the partly fabricated portion of the 3D item A1 in FIG. 4A, the dynamic surface 220 is in its first position, in which the curvature is a first curvature C1. In this example, the first curvature is about 0, such that the dynamic surface is configured to provide a relatively flat surface. As shown in FIG. 3A, the links are positioned about the same horizontal plane, are suitable to enable fabrication of a first layer thereon, and a partly fabricated portion of the 3D item A1 is positioned on top of the central link 230C. The first and second bottom support members 240A and 240B are in their first state and extend all the way under their corresponding first side and second side lateral links 222A and 222B.

Figure 3B:
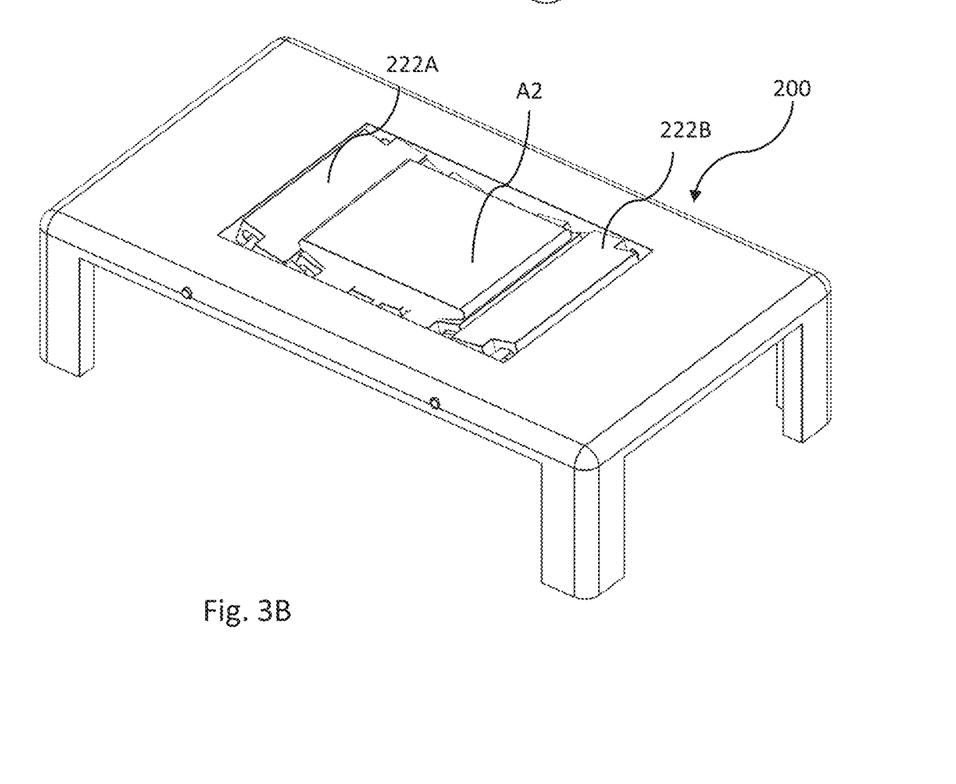
FIG. 3B is the support apparatus shown in FIG. 3A with the dynamic surface at an second position and a multi-layer portion of the printed 3D item placed thereon.
Figure 4A:
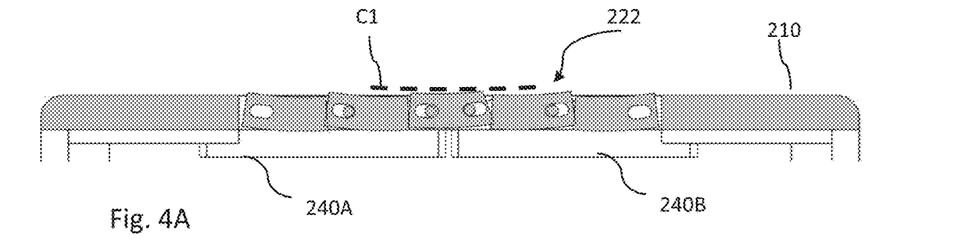
FIGS. 4A-4D are cross-sectional views of the support apparatus of FIGS. 3A to 3D, respectively, taken along the plane of symmetry.
Figure 4B:
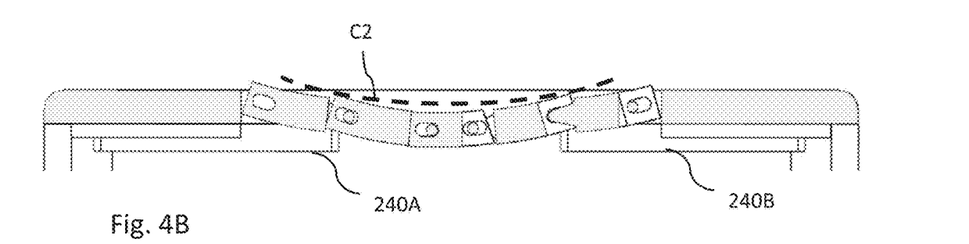

As shown in FIG. 3B, and its cross section without the fabricated portion of the 3D item A2 in FIG. 4B, the dynamic surface 220 is in its second position, in which the curvature is a second curvature C2 greater than the first curvature C1. The second curvature enabled fabrication of a consecutive layers forming a larger fabricated portion of the 3D item A2. In this example, the dynamic surface is configured to correlate the last printed layer of the fabricated portion of the 3D item A2 with the level of the support member 210 to ease fabrication of the layers by the printing head. In this position, the central link 222C and its two adjacent links are not being supported by the first and second bottom support members 240A and 240B, are positioned inside the central opening 212 and due to their increased curvature, the links support the curved surface of the fabricated portion of the 3D item A2.

Figure 3C:
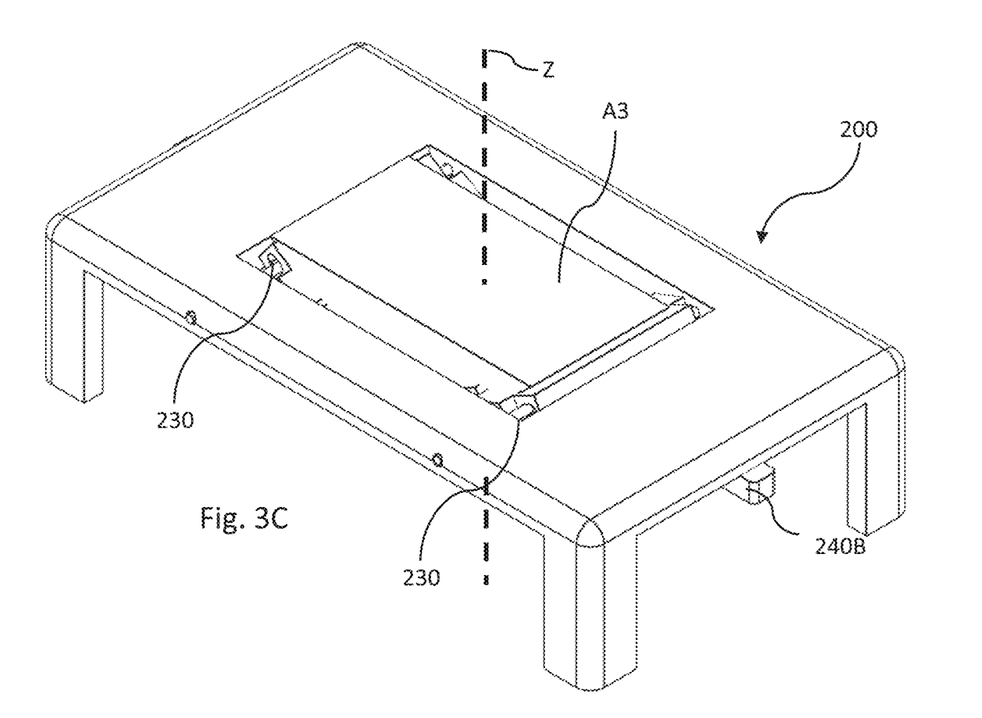
FIG. 3C is the support apparatus shown in FIG. 3A with the dynamic surface at a third position and the fabricated bottom half of the printed 3D item placed thereon.
Figure 4C:
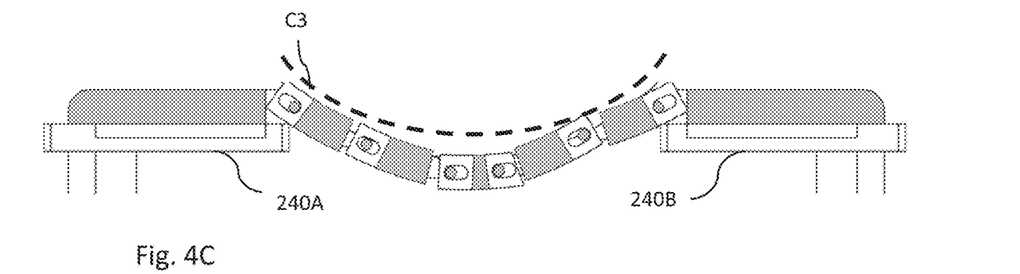

As shown in FIG. 3C, and its cross section without the fabricated bottom half of the printed 3D item A3 in FIG. 4C, the dynamic surface 220 is in a third position, in which the curvature is a third curvature C3 greater than the second curvature C2. The third curvature C3 enables fabrication of the bottom half of the printed 3D item A3. In this example, the top layer of the bottom half of the printed 3D item A3 is flush with the level of the support member 210. In order to enable printing of further layers, the printing head (not shown) or the support member 210 can be movable along the Z axis. In this position, only the links that are pivotally connected to the support member are supported by the first and second bottom support members 240A and 240B, and are partly titled about their corresponding curvature enabling member 230A and 230B. the rest of the links are distanced from one another, to enable the increased curvature.

Figure 3D:
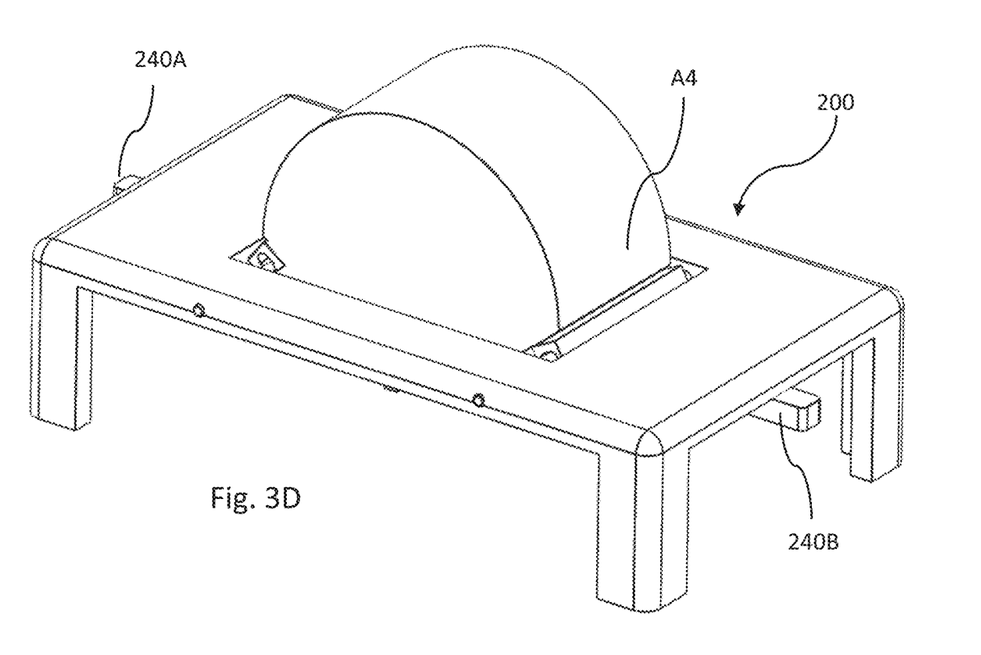
FIG. 3D is the support apparatus shown in FIG. 3A with the dynamic surface at a fourth position and a fully printed 3D item placed thereon.
Figure 4D:
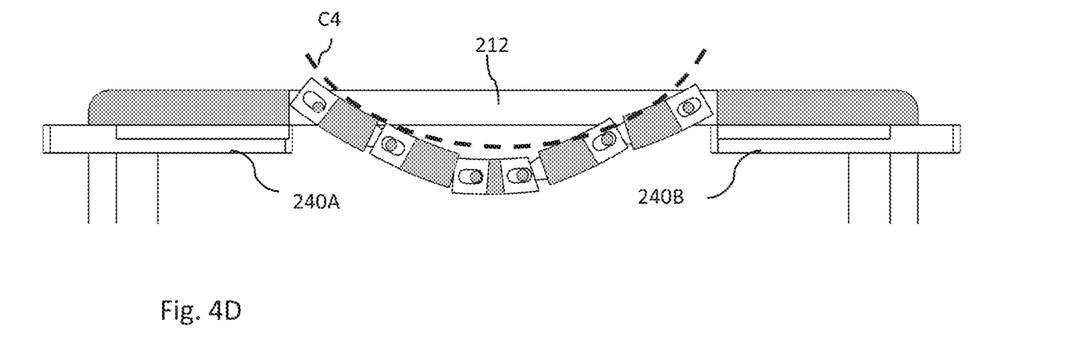

As shown in FIG. 3D, and its cross section without the fully fabricated printed 3D item A4 in FIG. 4D, the dynamic surface 220 is in a fourth position, in which the curvature is a fourth curvature C4 greater than the third C3. The fourth curvature C4 is the maximal curvature available for the apparatus of the present example. The printed 3D item is fully fabricated and the first and second bottom support members 240A and 240B are fully retracted and do not support any of the links of the dynamic surface 220.

Figure 5A:
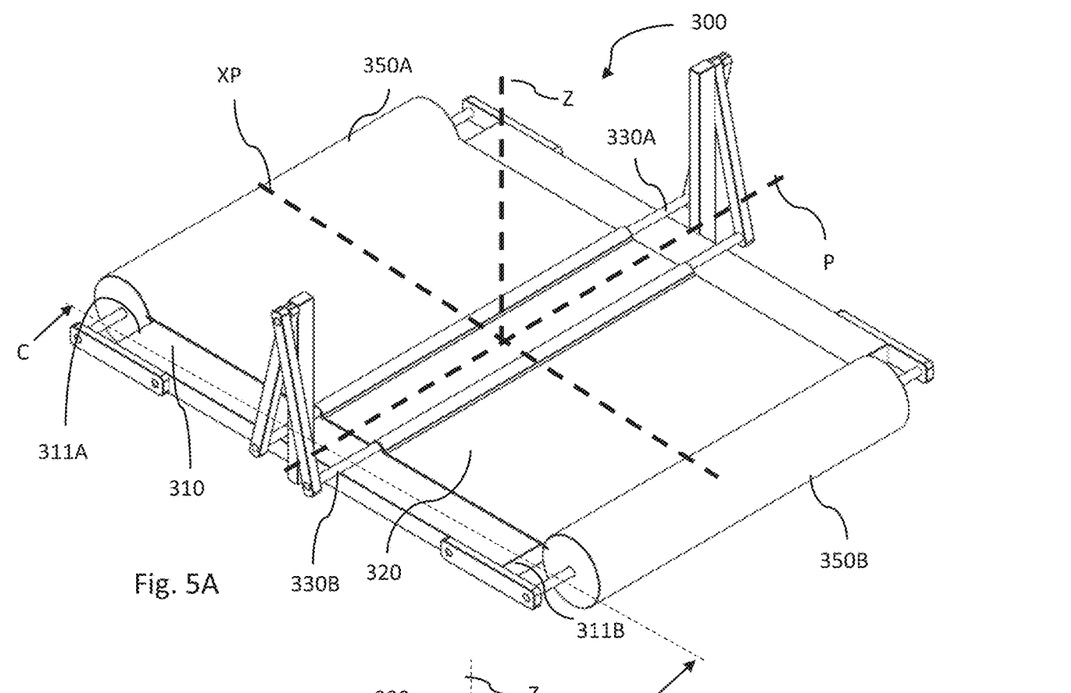
FIG. 5A illustrates a support apparatus having a dynamic surface in an initial, first position, according to a second example of the presently disclosed subject matter.
Figure 5B:
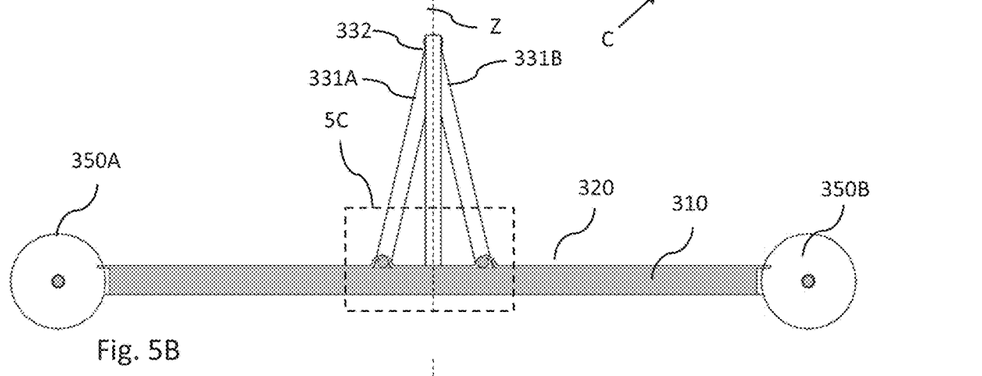
FIG. 5B is a cross-sectional view of the support apparatus shown in FIG. 5A, taken along the vertical plane C-C.
Figure 5C:
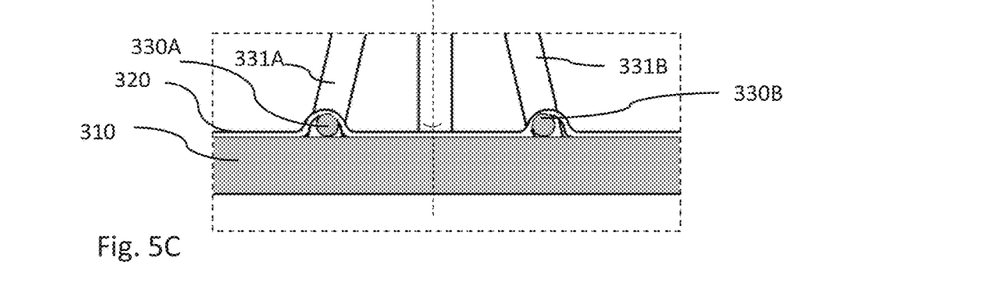
FIG. 5C is an enlarged view of area 5C in FIG. 5B.

FIGS. 5A-5C disclose a second example of the support apparatus in accordance with the presently disclosed subject matter, designated as 300. The support apparatus 300 comprises a support member 310 having a first lateral edge 311A, a second lateral edge 311B, a print axis P traversing the center thereof, and a cross-print axis XP horizontally normal to the print axis P traversing the length of the support member 310. The support member 310 is constituted by a surface, and a dynamic surface 320 comprising a sheet of continues material dimensioned and operable to be supported by the support member 310.

In general, the dynamic surface of the second example can be formed from an elastic material, and is configured to increase the curvature thereof by either gradually increasing the amount of sheet present above the support member 310 or enabling the sheet above the support member 310 to stretch. The manipulation mechanism of the second example can be configured to increase the distance of the dynamic surface from the support member (vertically) and from a first portion thereof positioned at a first side of the print axis P to a second portion thereof positioned at a second side of the print axis P (horizontally).

In the present example, the support apparatus 300 comprises a first and second corresponding curvature enabling member 330A and 330B, both rotatably connected by arms 331A and 331B to a manipulation tower 332A. The manipulation tower 332A is located on a plane defined by the print axis P and a vertical axis Z vertically normal to the print axis P. The first and second curvature enabling member 330A and 330B are positioned between the support member 310 and the dynamic surface 320 (as best shown in FIG. 5C). The manipulation tower 332A is configured to rotate the first and second curvature enabling members 330A and 330B in a clockwise and counterclockwise movements, respectively, so as to increase the angle therebetween, and respectively, the curvature of the dynamic surface 320 held thereby.

In order to maintain the tension of the dynamic surface required for reaching a desired curvature, the support member can comprise a sheet holder 350A positioned about the first lateral edge 311A, and have a sheet reservoir 350B positioned about the second lateral edge 311B (or vice versa). upon operation of the manipulation tower 332A, the sheet reservoir 350B can be configured to release a certain amount of sheet corresponding to the desired curvature as measured between the first and second curvature enabling member 330A and 330B and the support member 310. The instructions to release sheet, as well as the instructions to the manipulation tower 332A to manipulate the curvature enabling members 330A and 330B can be provided by a processing module (not shown) of the support apparatus, or of an ALM system comprising the support apparatus.

Figure 6A:
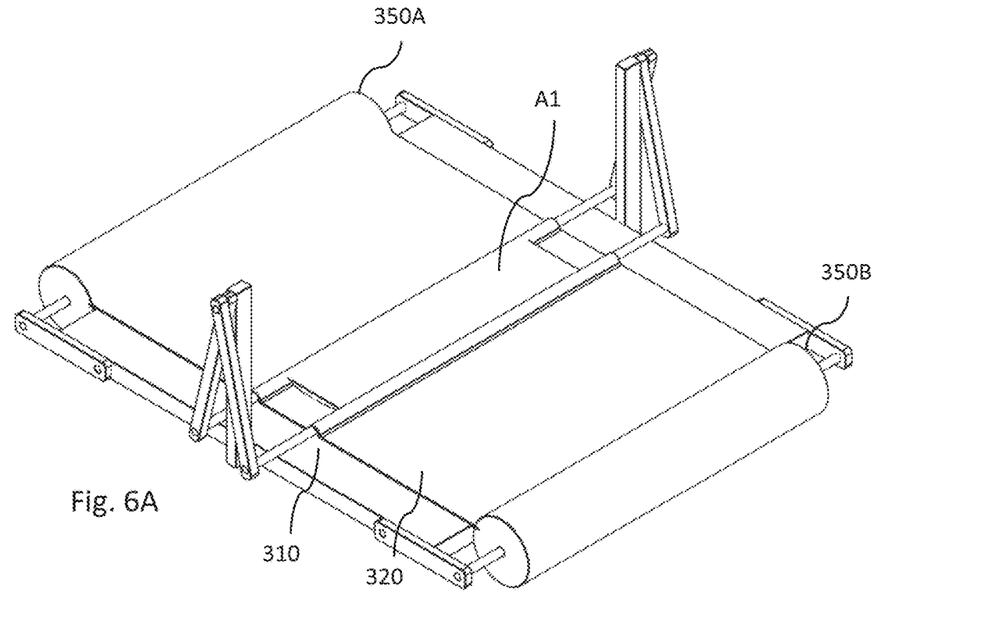
FIG. 6A is a perspective view of the support apparatus shown in FIG. 5A with the dynamic surface in an initial, first position and a first layer of a printed 3D item placed thereon.

FIGS. 6A to 6D, and FIGS. 7A to 7D illustrate the support apparatus 300 of the second example during a fabrication process of a printed 3D item A. As shown in FIG. 6A, and its cross section in FIG. 7A, the dynamic surface 320 is in its first position, in which the curvature is a first curvature determined by a first angle β1 measured between the manipulation tower 332A and the arm 331A rotatably connecting it to the corresponding curvature enabling member 330A. In this example, the first curvature is about 0, such that the dynamic surface is configured to provide a minimal curve (due to the sheet elevated from the support member by the curvature enabling member) for fabricating a first layer of the fabricated 3D item A1 thereon.

Figure 6B:
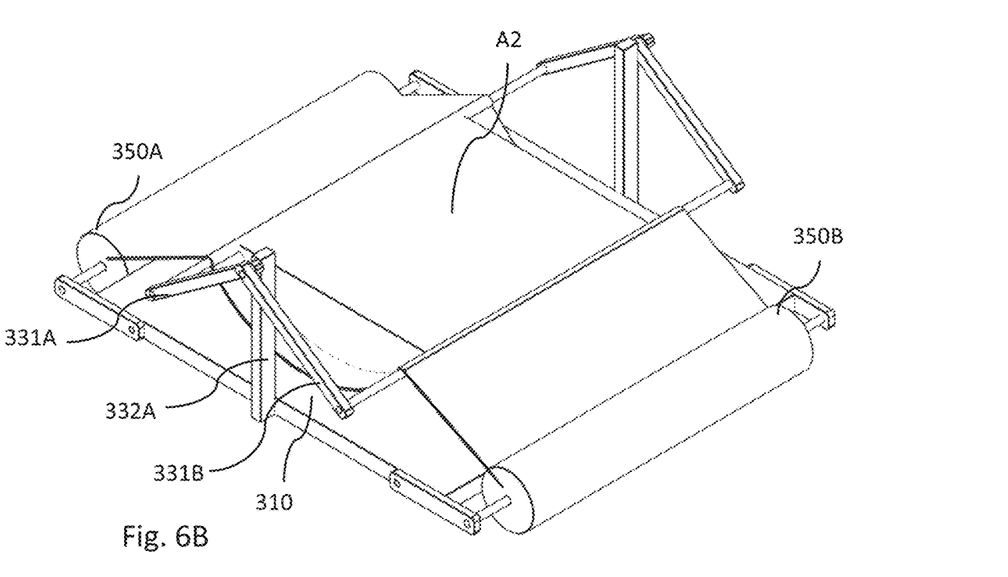
FIG. 6B is the support apparatus shown in FIG. 5A with the dynamic surface in a second and a multi-layer portion of the printed 3D item placed thereon.
Figures 7A, 7B, 7C:
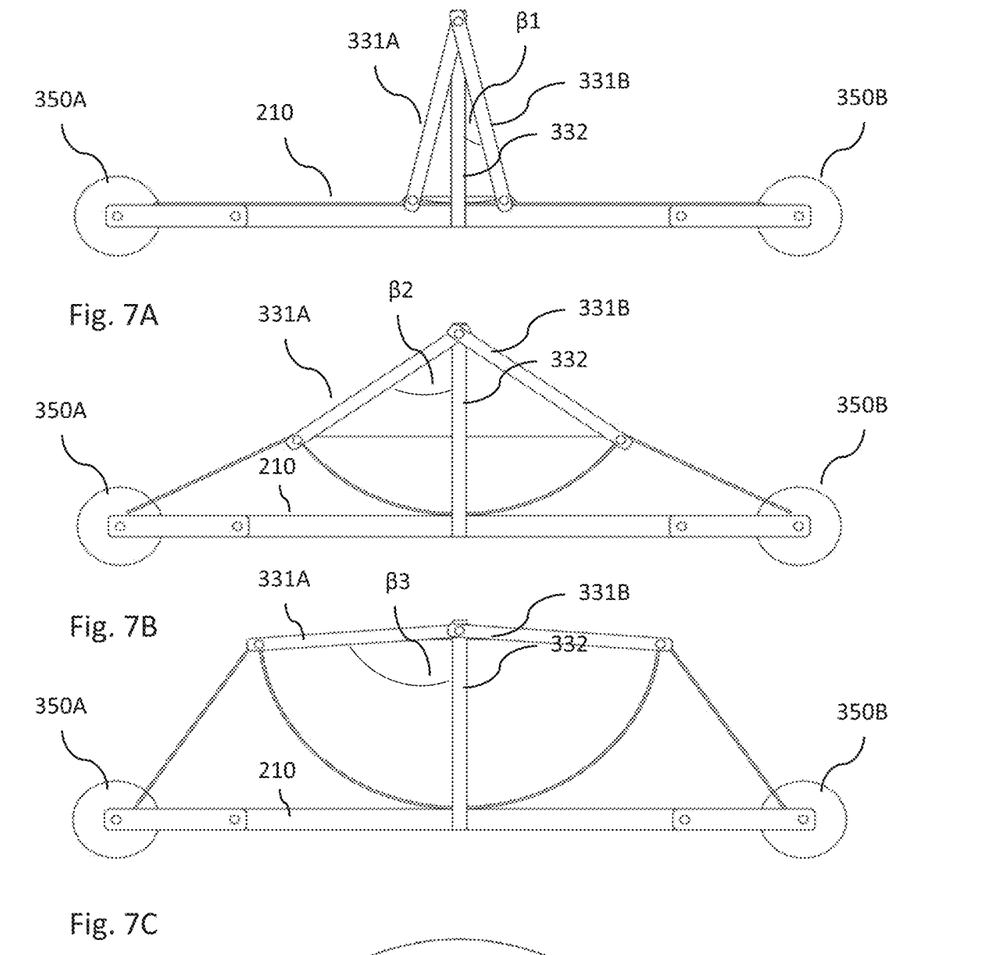
FIGS. 7A-7D are side views of the support apparatus of FIGS. 6A to 6D, respectively.

As shown in FIG. 6B, and its cross section in FIG. 7B, the dynamic surface 320 is in its second position, in which the curvature is a second curvature greater than the first curvature. The second curvature enabled fabrication of consecutive layers forming the larger fabricated portion of the 3D item A2. In this position, the first and second arms 331A and 331B forms a second angle β2 greater than the first β1.

Figure 6C:
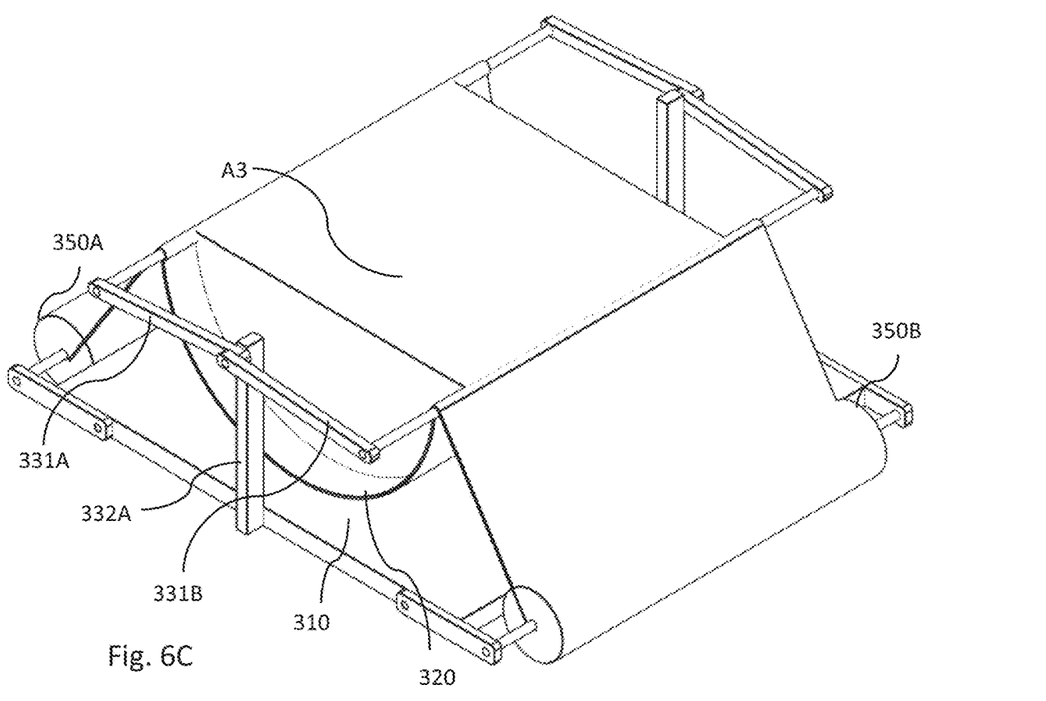
FIG. 6C is the support apparatus shown in FIG. 5A with the dynamic surface in a third position and the fabricated bottom half of the printed 3D item placed thereon.
Figure 6D:
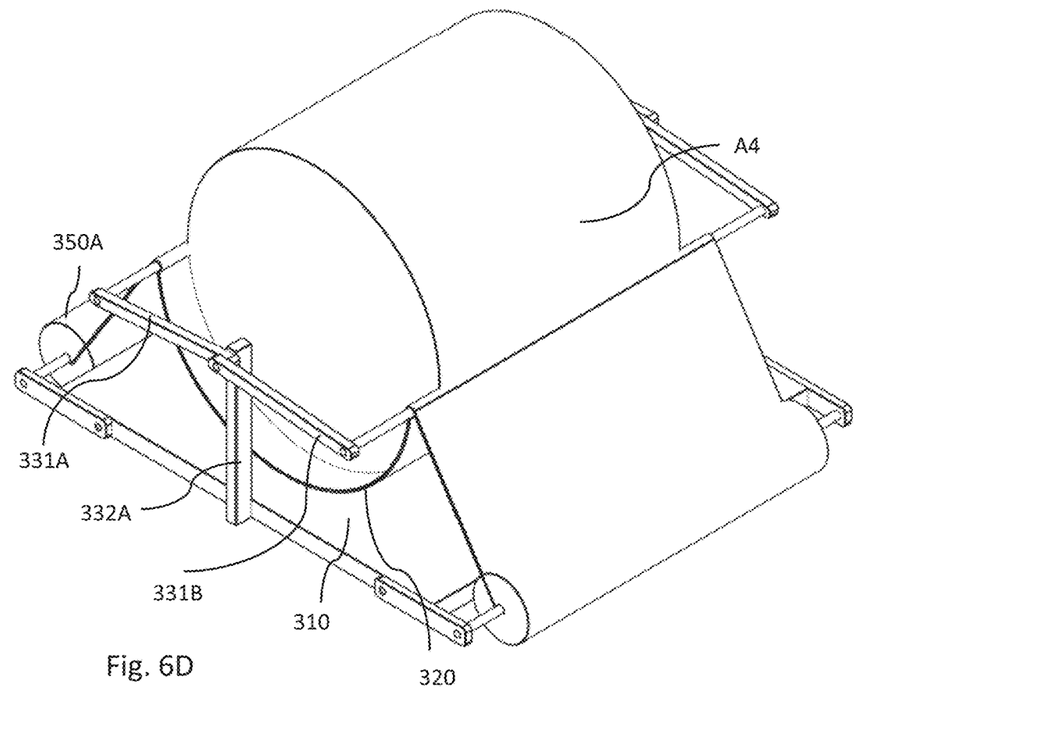
FIG. 6D is the support apparatus shown in FIG. 5A with the dynamic surface in a fourth position and a fully printed 3D item placed thereon.

As shown in FIG. 6C, and its cross section in FIG. 7C, the dynamic surface 320 is in a third position, in which the curvature is a third curvature greater than the second curvature. The third curvature enables fabrication of the entire bottom half of the printed 3D item A3. In this position, the first and second arms 331A and 331B forms a third angle β3 greater than the first β2.

Figure 7D:
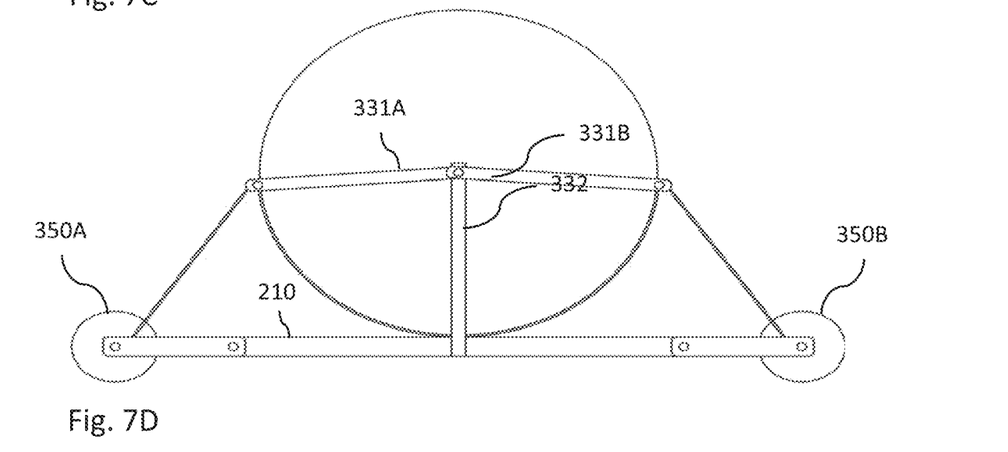

As shown in FIG. 7D, and its cross section in FIG. 7D, the dynamic surface 320 is in its fourth position, which is the maximal curvature available for the support apparatus of the second example and a fully fabricated 3D item A4 is positioned on top of the dynamic surface 320.

The invention claimed is:

1. A support apparatus for use in conjunction with an ALM system having a printing head being movable with respect to the support apparatus, said support apparatus comprising:
    a dynamic surface configured to support a printed 3D item thereon during fabrication thereof by the printing head, the dynamic surface being manipulable between a first position, at which the dynamic surface has a first concavity with respect to the printing head, and a second position, at which the dynamic surface has a second concavity with respect to the printing head, the second concavity being greater than the first concavity; and
    a manipulating mechanism operable to induce manipulation the dynamic surface at least from the first position to the second position, wherein the support apparatus comprises two curvature enabling members, each associated with a respective lateral side of the dynamic surface and configured to enable the manipulating mechanism to increase the curvature of the dynamic surface thereby.

2. The support apparatus of claim 1, wherein at its first position, the dynamic surface has a first surface area, and at its second position, the dynamic surface has a second surface area being larger than the first surface area.

3. The support apparatus of claim 1, wherein the curvature enabling members is configured to react to the manipulation made by the manipulation mechanism, so as to enable the curvature of the dynamic surface to be increased.

4. The support apparatus of claim 3, wherein the manipulation mechanism is configured to induce displacement of the dynamic surface, wherein the displacement of the dynamic surface is enabled by the curvature enabling members.

5. The support apparatus of claim 3, wherein the manipulation mechanism is configured to displace the curvature enabling members, so as increase the curvature of the dynamic surface by acting thereon.

6. The support apparatus of claim 1, wherein each of the two curvature enabling members being distanced to a different lateral side of a print axis along a cross-print axis, wherein the concavity of the dynamic surface is measured between the two curvature enabling members.

7. The support apparatus of claim 6, wherein each of the curvature enabling members are aligned on an axis parallel to the print axis and constitutes a lateral edge of the dynamic surface.

8. The support apparatus of claim 6, wherein the curvature enabling members are not symmetrical with respect to the print axis.

9. The support apparatus of claim 1, wherein the manipulating mechanism is configured to gradually increase the curvature of the dynamic surface from the first position to the second position.

10. The support apparatus of claim 1, wherein the manipulating mechanism has a first state, corresponding to the first position of the dynamic surface, in which the dynamic surface is not enabled to reach its second concavity, and a second state, corresponding to the second position of the dynamic surface, in which the dynamic surface is enabled to reach its second concavity.

11. The support apparatus of claim 10, wherein in the first state of the manipulating mechanism, the manipulation mechanism is configured to prevent the dynamic surface from reaching its second concavity under the influence of gravity, and in the enabling state of the manipulating mechanism, it is configured to enable the dynamic surface to reach its second concavity under the influence of gravity.

12. The support apparatus of claim 7, wherein the manipulating mechanism is configured to gradually change the state of the dynamic surface from the first state to the second state, in an automated manner in accordance with the amount of weight supported by the dynamic surface.

13. The support apparatus of claim 1, wherein the curvature of the dynamic surface forms a spaceless continuous sheet of elastic material.

14. The support apparatus of claim 1, wherein the fabricated 3D item is made from edible materials.

15. A support apparatus for use in conjunction with an ALM system having a printing head being movable with respect to the support apparatus, said support apparatus comprising:
- a dynamic surface configured to support a printed 3D item thereon during fabrication thereof by the printing head, the dynamic surface being manipulable between a first position, at which the dynamic surface has a first concavity with respect to the printing head, and a second position, at which the dynamic surface has a second concavity with respect to the printing head, the second concavity being greater than the first concavity; and
- a manipulating mechanism operable to induce manipulation the dynamic surface at least from the first position to the second position, wherein the manipulating mechanism is configured to provide the dynamic surface with a bottom support, such that in first position thereof most of the dynamic surface is being supported, and in the second position thereof most of the dynamic surface is free from being supported thereby.

16. The support apparatus of claim 15, wherein the dynamic surface comprises a plurality of links hingably connected to each other and is pivotally connected to a support member by first and second lateral links, and the manipulating mechanism comprises a bottom support moveably positioned below the dynamic surface.

17. The support apparatus of claim 16, wherein the bottom support is moveable between the first position of the dynamic support, in which it provides support for all of the links of the dynamic surface, and the second position of the dynamic support, in which none of the plurality of links of the dynamic surface are supported thereby.

18. The support apparatus of claim 16, wherein the bottom support comprises at least a pair of opposite motorized bars, each being positioned from a different lateral side of the print axis, and are operable to be moved in opposite directions.

19. The support apparatus of claim 18, wherein the pair of opposite motorized bars are operative to move simultaneously.

20. The support apparatus of claim 18, wherein each one of the motorized bars is configured with a length which is at least equal to the length between its corresponding lateral link of the dynamic surface to the print axis.

21. The support apparatus of claim 16, wherein the bottom support structure is configured to be arrested in any position along its path from the first position of the dynamic surface and the second position of the dynamic surface.

22. The support apparatus of claim 15, wherein the dynamic surface is made from a thin sheet of elastic material dimensioned and operable to be supported by a support member, and the manipulating mechanism comprises a vertical displacement mechanism having at least a portion thereof positioned between the dynamic surface and the support member.

23. The support apparatus of claim 22, wherein the vertical displacement mechanism is moveable between a first state corresponding to the first position of the dynamic surface, in which at least the portion thereof that is positioned between the dynamic support and the support member is distanced from the support member to a first distance, and a second state corresponding to the second position of the dynamic support structure, in which at least the portion thereof positioned between the dynamic surface and the support member is distanced from the support member to a second distance larger than the first distance.

24. The support apparatus of claim 22, wherein the manipulating mechanism is constituted by a pair of elevating rods positioned in parallel to the print axis, each on other lateral side thereof, and are operable to be moved simultaneously and in a mirror image manner.

25. The support apparatus of claim 24, wherein each one of the elevating rods is configured with a length corresponding to the length of the dynamic surface along the print axis, so as to enable each of the elevating rods to vertically elevate a corresponding portion of the dynamic surface during transition from the first position to the second position.

26. The support apparatus of claim 22, wherein at least a portion of the dynamic surface is configured to rest onto the support member in both the first and second positions.

27. The support apparatus of claim 22, wherein the dynamic surface is secured at both ends thereof to a portion of the support member to maintain a predetermined tension at least in the first position thereof.

28. A support apparatus for use in conjunction with an ALM system having a printing head being movable with respect to the support apparatus, said support apparatus comprising:
- a dynamic surface configured to support a printed 3D item thereon during fabrication thereof by the printing head, the dynamic surface being manipulable between a first position, at which the dynamic surface has a first concavity with respect to the printing head, and a second position, at which the dynamic surface has a second concavity with respect to the printing head, the second concavity being greater than the first concavity; and
- a manipulating mechanism operable to induce manipulation the dynamic surface at least from the first position to the second position, further comprising a processing module configured to receive data from the ALM system and to actuate the manipulating mechanism in accordance with the received data.

29. The support apparatus of claim 28, wherein the received data from the ALM system comprises the number of layers constituting the printed 3D item, and configured to operate the manipulating mechanism in accordance with the serial number of the layer that is about to be printed.

30. The support apparatus of claim 29, wherein the received data further comprises measurements of the layers constituting the printed 3D item, and configured to operate the manipulating mechanism for providing sufficient support for layers that are configured with greater measurements than their preceding layer.

31. The support apparatus of claim 28, wherein the received data comprises the accumulated weight present onto the dynamic surface.

32. A method for fabricating a printed 3D item, said method comprising:
a. providing an ALM system comprising: a processing module; a movable printing head controllable by the processing module; and a support apparatus comprising:
  i. a dynamic surface configured to support fabrication of the printed 3D item thereon by the printing head, the dynamic surface being manipulable between a first position, at which the dynamic surface has a first concavity with respect to the printing head, and a second position, at which the dynamic surface has a second concavity with respect to the printing head, the second concavity being greater than the first concavity; and ii. a manipulating mechanism operable to induce manipulation the dynamic surface at least from the first position to the second position;

b. providing to the processing module a product design having pattern coordinates to the ALM system;

c. providing by the processing module instructions for the printing head to print at least one layer onto the dynamic surface in accordance with the pattern coordinates;

d. providing by the processing module instructions for the manipulation mechanism to increase the concavity of the dynamic surface from the first concavity; and e. providing instructions for the printing head to print at least one further layer having a surface area larger than the first layer on top of the first layer in accordance with the pattern coordinates, and wherein the support apparatus further comprising two curvature enabling members, each associated with a respective lateral side of the dynamic surface and configured to enable the manipulating mechanism to increase the curvature of the dynamic surface thereby.

33. The method of claim 32, wherein the method further comprises step c* between steps c and d, comprising calculating whether the next layer should require further support in addition to the support provided by the previous printed layer, and if so to calculate the extent of support that the dynamic surface should provide to be able to sufficiently support the next layer in addition to the support provided by the preceding layer and wherein the instructions provided in step d are based on said calculation.

34. The method of claim 32, wherein the pattern coordinates comprising sequential cross-sectional layers of the printed 3D item being fabricated, each of the cross-sectional layers comprises a plurality of pixels, wherein each pixel comprises signals for the printing head for fabricating at least one of two edible components on a corresponding pixel on the support apparatus.

35. The method of claim 34, wherein the pixels are configured to comprise void signal signaling the printing head to leave a corresponding pixel on the support apparatus empty.

36. The method of claim 35, wherein the amount of pixels having void signal is configured to increase or remain same between each layer with respect to its preceding layer, at least in a bottom half of the printed 3D item.

37. An ALM system for fabrication of a printed 3D item, said ALM system comprising:

a. a processing module;

b. a moveable printing head controllable by the processing module; and c. a support apparatus comprising:

i. a dynamic surface configured to support fabrication of the 3D item thereon by the printing head, the dynamic surface being manipulable between a first position, at which the dynamic surface has a first concavity with respect to the printing head, and a second position, at which the dynamic surface has a second concavity with respect to the printing head, the second concavity being greater than the first concavity; and ii. a manipulating mechanism operable by the processing module to induce manipulation the dynamic surface at least from the first position to the second position, wherein the support apparatus further comprising two curvature enabling members, each associated with a respective lateral side of the dynamic surface and configured to enable the manipulating mechanism to increase the curvature of the dynamic surface thereby.

38. The ALM system of claim 37, wherein the printing head comprises at least one extruder and is moveable along a print axis and a cross-print axis, while being configured to maintain the orientation of the at least one extruder relative to the ground.

39. The ALM system of claim 38, wherein the printing head is also moveable along a Z axis.

* * * * *